United States Patent
Yoshimori (10) Patent No.: US 10,638,062 B1
(45) Date of Patent: Apr. 28, 2020

(54) SPECTRALLY-RESOLVED THREE-DIMENSIONAL SHAPE MEASUREMENT DEVICE AND SPECTRALLY-RESOLVED THREE-DIMENSIONAL SHAPE MEASUREMENT METHOD

(71) Applicant: SHIMADZU CORPORATION, Kyoto-shi, Kyoto (JP)

(72) Inventor: Kyu Yoshimori, Morioka (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/203,882

(22) Filed: Nov. 29, 2018

(51) Int. Cl.
```
H04N 5/341    (2011.01)
G01B 9/02     (2006.01)
G02B 27/14    (2006.01)
G01B 11/24    (2006.01)
```

(52) U.S. Cl.
CPC ......... *H04N 5/341* (2013.01); *G01B 9/02015* (2013.01); *G01B 11/2441* (2013.01); *G02B 27/14* (2013.01)

(58) Field of Classification Search
CPC .................................................. H04N 5/341
USPC .......................................................... 348/308
See application file for complete search history.

(56) References Cited

U.S. PATENT DOCUMENTS 6,980,299 B1 * 12/2005 de Boer ............. G01B 9/02091
                                                              356/497
2016/0139561 A1    5/2016 Kim

FOREIGN PATENT DOCUMENTS

JP      2011-021991 A     2/2011

OTHER PUBLICATIONS

Dinesh N. Naik, et al., "Spectrally resolved incoherent holography: 3D spatial and spectral imaging using a Mach-Zehnder radial-shearing interferometer", Optics Letters, Optical Society of America, 2014, pp. 1857-1860, vol. 39, No. 7.
Myung K. Kim, "Full color natural light holographic camera", Optics Express, Optical Society of America, 2013, pp. 9636-9642, vol. 21, Issue No. 8.
Notice of Reasons for Refusal dated Jan. 7, 2020 from the Japanese Patent Office in application No. 2016-105606.

* cited by examiner

Primary Examiner — Joel W Fosselman
(74) Attorney, Agent, or Firm — Sughrue Mion, PLLC (57) ABSTRACT

An apparatus includes: an interferometer configured to produce white light fringes with measuring light reflected or scattered by an object; an image sensor configured to generate an image signal for each pixel; and a controller. The interferometer splits the measuring light into two luminous fluxes and reflects them on reflecting mirrors having different curvatures. A white light fringe signal is obtained by varying the optical path difference between the two luminous fluxes. The controller is configured to perform frequency conversion on the white light fringe signal, with respect to the optical path difference, to determine a cross spectral density representing spectral information of each point on the object. The controller is configured to perform back-propagation computation based on Fresnel diffraction integral on the cross spectral density to determine a wavefront of light from each point on the object.

3 Claims, 4 Drawing Sheets

SPECTRALLY-RESOLVED THREE-DIMENSIONAL SHAPE MEASUREMENT DEVICE AND SPECTRALLY-RESOLVED THREE-DIMENSIONAL SHAPE MEASUREMENT METHOD

This nonprovisional application is based on Japanese Patent Application No. 2016-105606 filed on May 26, 2016 with the Japan Patent Office, the entire contents of which are hereby incorporated by reference.

BACKGROUND OF THE INVENTION

Field of the Invention

The present invention relates to a spectrally-resolved three-dimensional shape measurement device and a spectrally-resolved three-dimensional shape measurement method to measure the three-dimensional shape and the spectral information of an object.

Description of the Background Art

A technique for measuring the three-dimensional shape and the spectral information of an object using white light interference has conventionally been proposed. For example, a spectrally-resolved three-dimensional shape measurement device disclosed in Japanese Patent Laying-Open No. 2011-21991 includes an interferometer to produce white light fringes based on measuring light reflected or scattered by an object illuminated with white light, a point detector to measure the intensity of light outputted from the interferometer, and a controller connected to the point detector to determine the three-dimensional shape and the spectral information of the object from a white light interference signal. The interferometer splits the measuring light into two luminous fluxes. The controller produces three-dimensional white light fringes by varying the positional relationship between the interferometer and the object and varying the optical path difference between the two luminous fluxes. The controller performs frequency conversion on the three-dimensional white light fringes, with respect to the optical path difference, to determine the cross spectral density representing the spectral information at a given point of the object. The controller performs frequency conversion on the cross spectral density, with respect to the movement amount of the interferometer, to determine the wavefront of light from the given point on the object.

In the technique described in Naik et al. ("Spectrally resolved incoherent holography: 3D spatial and spectral imaging using a Mach Zehnder radial-shearing interferometer", OPTICS LETTERS, Optical Society of America, Vol. 39, No. 7, pp. 1857-1860, 2014), light from an object is guided into a Mach-Zehnder interferometer. An interference signal is acquired using an image sensor while a piezoelectric element is moving a reflecting mirror disposed on one of the optical paths of the Mach-Zehnder interferometer. The technique reproduces the three-dimensional shape information and the spectral information of the object from the interference signal.

In the technique described in Kim ("Full color natural light holographic camera", OPTICS EXPRESS, Optical Society of America, Vol. 21, Issue 8, pp. 9639-9642, 2013), light from an object is split into two luminous fluxes by a beam splitter. One of the luminous fluxes is reflected by a concave mirror, while the other is reflected by a plane mirror. The reflected luminous fluxes then pass through the beam splitter again to be combined with each other. The combined luminous flux is imaged by a CCD camera having three color channels: red (R), green (G), and blue (B). In this technique, the CCD camera images the combined luminous flux while the plane mirror is moved in the direction away from the beam splitter, thus generating a plurality of images for each color channel. From the images obtained for each color channel, a hologram is regenerated for each color channel. The holograms are superimposed on one another to be a full-color hologram for the object.

In the technique disclosed in Japanese Patent Laying-Open No. 2011-21991, during a measuring operation, a position of an interferometer relative to an object is two-dimensionally moved to produce interference fringes caused by interference between different wavefront positions, so that the wavefront from each point on the object is reproduced. The technique acquires interference fringes by varying the optical path difference between two luminous fluxes, so as to examine the wavelength of light reflected or scattered at each point on the object during the measuring operation. Specifically, during the measuring operation, the technique moves the interferometer along each of two axes orthogonal to each other, and further moves one of two reflector elements, included in the interferometer, along one axis. In this technique, therefore, the measuring operation takes too much time. In particular, if the object is an object that changes over time (e.g. a living body), the technique may not accurately measure the three-dimensional shape or the spectral information of the object, due to the change in the object during the measuring operation.

In the technique described in Naik et al., the optical path difference between two luminous fluxes is varied by moving a mirror disposed on one of the optical paths of the Mach-Zehnder interferometer. The technique therefore involves a wavefront aberration. In order to measure the wavefront aberration, the technique brings laser light into the interferometer separately from light from the object, senses the laser light by the image sensor, and corrects the wavefront aberration based on the sensing results. The technique, therefore, requires a complex optical system for measuring white light fringes.

In the technique disclosed in Kim, in order to obtain the spectral information, one of the reflecting mirrors needs to be moved for each color channel. Therefore, with the increase in the number of color channels for regenerating the wavefront of an object, a longer time is required for measuring the object.

SUMMARY OF THE INVENTION

In view of the above problems, an object of the present invention is to provide a spectrally-resolved three-dimensional shape measurement device and a spectrally-resolved three-dimensional shape measurement method capable of measuring the three-dimensional shape and the spectral information of an object while reducing a time required for measuring the object.

According to one embodiment of the present invention, a spectrally-resolved three-dimensional shape measurement device for obtaining a three-dimensional shape and spectral information of an object is provided. The spectrally-resolved three-dimensional shape measurement device comprises: an interferometer configured to produce white light fringes based on measuring light reflected or scattered by the object illuminated with light having wavelengths; an image sensor configured to generate an image signal for each pixel, the image signal representing an intensity distribution of light outputted from the interferometer; and a controller connected to the image sensor and configured to determine the three-dimensional shape and the spectral information of the object from the image signal. The interferometer includes: a beam splitting element configured to split the measuring light into a first luminous flux and a second luminous flux; a first reflecting mirror having the first reflection surface arranged for reflecting the first luminous flux to the beam splitting element, the first reflection surface having a first curvature; a second reflecting mirror having the second reflection surface arranged for reflecting the second luminous flux to the beam splitting element, the second reflection surface having a second curvature different from the first curvature; and a movable stage configured to move the second reflecting mirror in a first direction parallel to a straight line that connects the beam splitting element and the second reflecting mirror to each other, so as to change a distance between the beam splitting element and the second reflecting mirror, thereby producing an optical path difference between the first luminous flux and the second luminous flux. The controller is configured to: acquire a white light fringe signal represented by a plurality of image signals generated by the image sensor, while controlling the movable stage to move the second reflecting mirror in the first direction; perform frequency conversion on the white light fringe signal, with respect to the optical path difference between the first luminous flux and the second luminous flux, so as to determine a cross spectral density representing spectral information of each point on the object; and perform back-propagation computation based on Fresnel diffraction integral on the cross spectral density, so as to determine a wavefront of light reflected or scattered at each point on the object.

In the spectrally-resolved three-dimensional shape measurement device, both of the first reflecting mirror and the second reflecting mirror are preferably concave mirrors.

According to another embodiment of the present invention, a spectrally-resolved three-dimensional shape measurement method adapted for a spectrally-resolved three-dimensional shape measurement device is provided. The spectrally-resolved three-dimensional shape measurement device comprises: an interferometer configured to produce white light fringes with measuring light reflected or scattered by an object illuminated with light having wavelengths; and an image sensor configured to generate an image signal for each pixel, the image signal representing an intensity distribution of light outputted from the interferometer. The interferometer includes: a beam splitting element configured to split the measuring light into a first luminous flux and a second luminous flux; a first reflecting mirror having a reflection surface arranged for reflecting the first luminous flux to the beam splitting element, the reflection surface having a first curvature; a second reflecting mirror having a reflection surface arranged for reflecting the second luminous flux to the beam splitting element, the reflection surface having a second curvature different from the first curvature; and a movable stage configured to move the second reflecting mirror in a first direction parallel to a straight line that connects the beam splitting element and the second reflecting mirror to each other, so as to change a distance between the beam splitting element and the second reflecting mirror, thereby producing an optical path difference between the first luminous flux and the second luminous flux. The spectrally-resolved three-dimensional shape measurement method comprises: acquiring a white light fringe signal represented by a plurality of image signals generated by the image sensor, while controlling the movable stage to move the second reflecting mirror in the first direction; performing frequency conversion on the white light fringe signal, with respect to the optical path difference between the first luminous flux and the second luminous flux, so as to determine a cross spectral density representing spectral information of each point on the object; and performing back-propagation computation based on Fresnel diffraction integral on the cross spectral density, so as to determine a wavefront of light reflected or scattered at each point on the object.

The present invention provides a spectrally-resolved three-dimensional shape measurement device and a spectrally-resolved three-dimensional shape measurement method capable of measuring the three-dimensional shape and the spectral information of an object while reducing a time required for measuring the object.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A spectrally-resolved three-dimensional shape measurement device according to an embodiment of the present invention will now be described with reference to the drawings.

A spectrally-resolved three-dimensional shape measurement device according to one embodiment of the present invention splits light reflected or scattered by an object illuminated with white light, into two luminous fluxes, by a beam splitting element of an interferometer. The spectrally-resolved three-dimensional shape measurement device produces a difference in wavefront between the two luminous fluxes by reflecting the two luminous fluxes on two reflecting mirrors separately disposed and having different curvatures. The spectrally-resolved three-dimensional shape measurement device then combines the two luminous fluxes into one luminous flux again. During the measuring operation, the spectrally-resolved three-dimensional shape measurement device measures the intensity distribution of the combined luminous flux by an image sensor while moving one of the reflecting mirrors in such a direction as to change the optical path difference between the two luminous fluxes. The spectrally-resolved three-dimensional shape measurement device thus obtains white light fringes including both the three-dimensional shape information and the spectral information of the object. Since the spectrally-resolved three-dimensional shape measurement device obtains white light fringes by moving only one of the reflecting mirrors in one direction, the device can measure the three-dimensional shape and the spectral information of the object in a reduced time.

Figure 1:
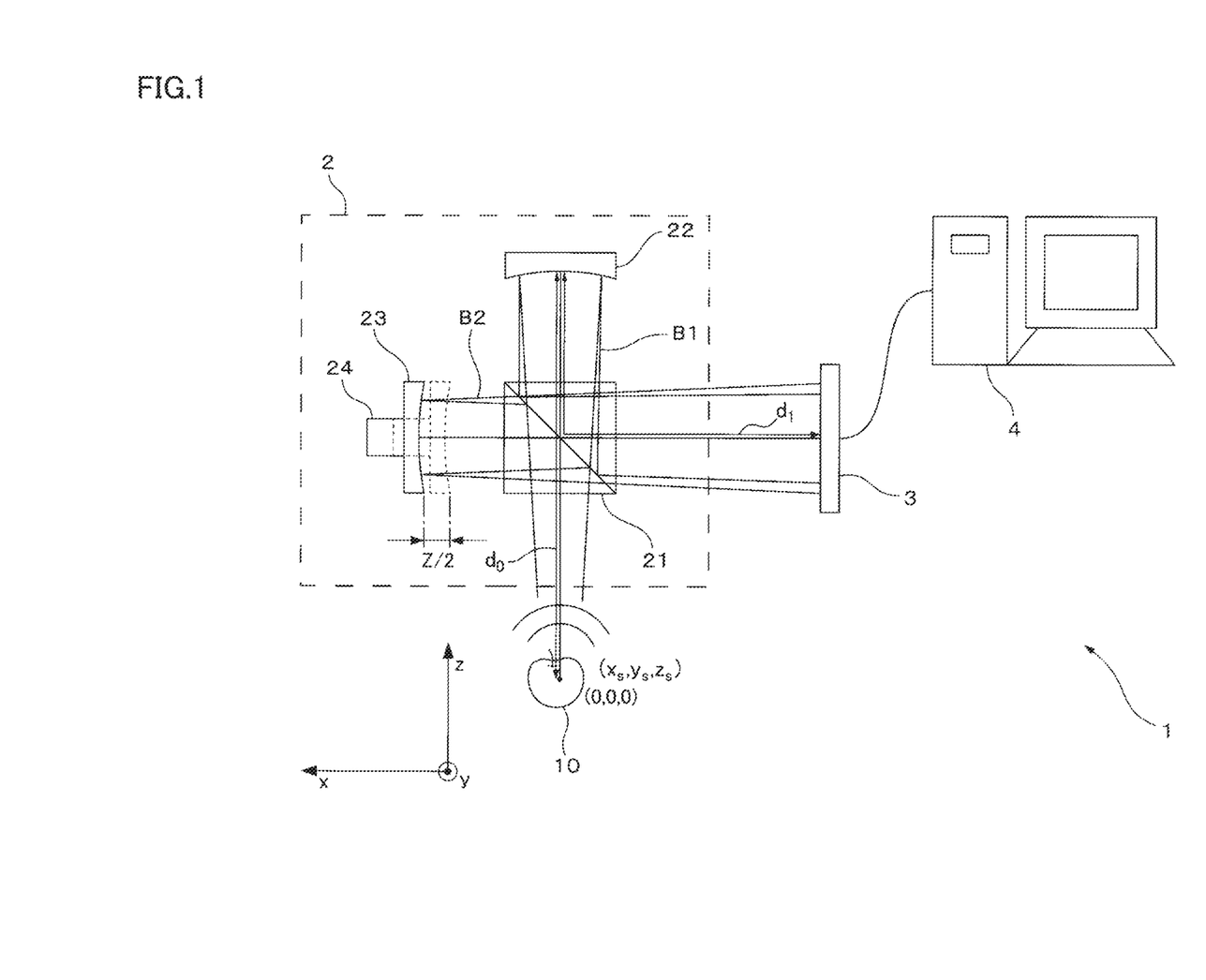
FIG. 1 is a schematic configuration diagram of a spectrally-resolved three-dimensional shape measurement device according to one embodiment of the present invention.

FIG. 1 schematically shows a configuration of a spectrally-resolved three-dimensional shape measurement device 1 according to one embodiment of the present invention. Spectrally-resolved three-dimensional shape measurement device 1 includes an interferometer 2, an image sensor 3, and a controller 4. A condensing optical system (not shown) may further be disposed between interferometer 2 and image sensor 3 to condense a luminous flux traveling from interferometer 2 to image sensor 3. Alternatively, a condensing optical system may be disposed between an object 10 and interferometer 2 to condense a luminous flux traveling from object 10 to interferometer 2.

Interferometer 2 includes a beam splitting element 21, a first reflecting mirror 22, a second reflecting mirror 23, and a fine movement stage 24. Beam splitting element 21 is formed by a beam splitter or a half-silvered mirror, for example. Beam splitting element 21 splits measuring light reflected or scattered by object 10 illuminated with white light, into a first luminous flux B1 that travels to first reflecting mirror 22 and a second luminous flux B2 that travels to second reflecting mirror 23. Beam splitting element 21 combines first luminous flux B1 reflected by first reflecting mirror 22 with second luminous flux B2 reflected by second reflecting mirror 23 into one luminous flux, and outputs the combined luminous flux to image sensor 3.

The light source for illuminating object 10 may be of any type and may be placed in any way. Various types of light sources that emit light having two or more wavelengths may be used, such as natural light, a white LED, and a plurality of monochromatic LEDs with different wavelengths. It is preferable that a surface of object 10 be illuminated with as uniform an illuminance as possible.

First reflecting mirror 22 is disposed so that its reflection surface faces beam splitting element 21 and so that the distance between beam splitting element 21 and first reflecting mirror 22 is constant. In the present embodiment, first reflecting mirror 22 is disposed opposite to object 10 across beam splitting element 21.

Second reflecting mirror 23 is disposed so that its reflection surface faces beam splitting element 21 in the direction orthogonal to the line that connects object 10 and first reflecting mirror 22 to each other. Second reflecting mirror 23 is disposed on fine movement stage 24 movably in the direction away from beam splitting element 21.

First reflecting mirror 22 and second reflecting mirror 23 have different curvatures. For example, first reflecting mirror 22 may be a plane mirror, and second reflecting mirror 23 may be a concave mirror. Both of the two reflecting mirrors may be concave mirrors. This enables a shorter distance between interferometer 2 and image sensor 3 and can downsize spectrally-resolved three-dimensional shape measurement device 1. Alternatively, at least one of the reflecting mirrors may be a convex mirror. Thus, first reflecting mirror 22 and second reflecting mirror 23 have different reflection surface curvatures. Therefore, first reflecting mirror 22 and second reflecting mirror 23 differently modulate the wavefronts of luminous flux B1 and luminous flux B2, respectively, when reflecting them. When the two wavefronts are superimposed, white light interference occurs according to the difference in wavefront between luminous flux B1 and luminous flux B2 and according to the optical path difference between luminous flux B1 and luminous flux B2. Preferably first reflecting mirror 22 and second reflecting mirror 23 are disposed so that beam splitting element 21 turns the optical axis of first reflecting mirror 22 by 90 degrees to coincide with the optical axis of second reflecting mirror 23. This reduces the amount of computation for determining the three-dimensional shape information and the spectral information of object 10 from white light fringes represented by image signals generated by image sensor 3.

Fine movement stage 24 is formed by a piezo stage, for example. On fine movement stage 24, second reflecting mirror 23 is placed. Fine movement stage 24 is connected to controller 4. In response to a control signal from controller 4, fine movement stage 24 causes second reflecting mirror 23 placed on fine movement stage 24 to move in the direction away from beam splitting element 21, i.e., in the optical axis direction of second reflecting mirror 23. Movement of fine movement stage 24 enables adjustment of the distance between second reflecting mirror 23 and beam splitting element 21. As described above, beam splitting element 21 and first reflecting mirror 22 are fixedly disposed at a constant distance. By adjusting the distance between second reflecting mirror 23 and beam splitting element 21, interferometer 2 can produce a predetermined optical path difference between luminous flux B1 and luminous flux B2.

Hereinafter, a coordinate system is defined for convenience in which: the direction parallel to the plane where beam splitting element 21, first reflecting mirror 22, and second reflecting mirror 23 are disposed and along which luminous flux B2 travels to second reflecting mirror 23 is an x-axis; a direction orthogonal to the plane is a y-axis; and the direction parallel to the plane and along which luminous flux B1 travels to first reflecting mirror 22 is a z-axis. In this coordinate system, the origin (0,0,0) is set on the optical axis of first reflecting mirror 22 near object 10.

Image sensor 3 includes two-dimensionally arrayed solid state image sensing devices, such as CCD or CMOS devices. During the measuring operation in spectrally-resolved three-dimensional shape measurement device 1, image sensor 3 receives a luminous flux obtained by combining luminous flux B1 reflected by first reflecting mirror 22 and luminous flux B2 reflected by second reflecting mirror 23. Image sensor 3 generates an image signal indicating a pixel value of each pixel according to the intensity of the received light at the pixel. Specifically, during the measuring operation, image sensor 3 generates a plurality of image signals representing the intensity distribution of a luminous flux obtained by combining luminous flux B1 and luminous flux B2. Different images correspond to different optical path differences between luminous flux B1 and luminous flux B2. Image sensor 3 is connected to controller 4. Each time image sensor 3 generates an image signal, image sensor 3 outputs the image signal to controller 4. For example, image sensor 3 generates about 100 to 1000 images during one measuring operation.

Controller 4 is formed by a so-called computer. Controller 4 controls the overall spectrally-resolved three-dimensional shape measurement device 1. Based on images obtained from image sensor 3, controller 4 regenerates the wavefront from each point on object 10, namely, the spectral information of each point on object 10 and the three-dimensional shape information of object 10.

Figure 2:
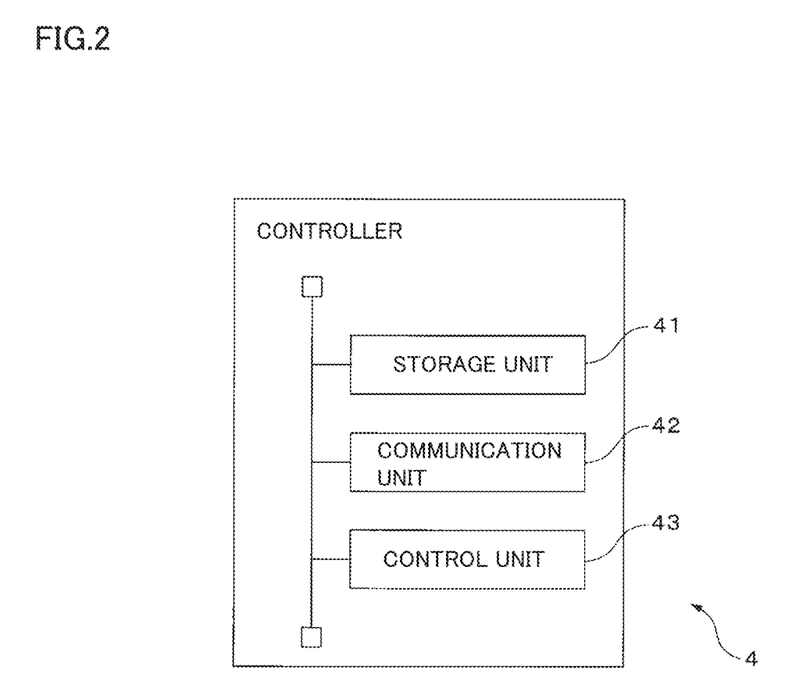
FIG. 2 is a functional block diagram of a controller.

FIG. 2 shows a functional block diagram of controller 4. As shown in FIG. 2, controller 4 includes: a storage unit 41 including at least one of a nonvolatile or volatile semiconductor memory, a magnetic disk, an optical disk, and a reader of them; a communication unit 42 including an interface circuit configured in accordance with communication standards (e.g. RS232C, Universal Serial Bus, and Ethernet (registered trademark)), and software (e.g. a device driver); and a control unit 43 including one or more processor, such as a CPU and a numerical value computation processor, and a peripheral circuit of the processor.

Control unit 43 controls fine movement stage 24 by sending a control signal via communication unit 42, so as to move second reflecting mirror 23 in the x-axis direction and change the optical path difference between luminous flux B1 and luminous flux B2. During the measuring operation, control unit 43 changes the optical path difference by an amount such that white light fringes can be obtained over the range of wavelength for which regeneration of spectral information of object 10 is to be performed. For example, control unit 43 changes the optical path difference within a range corresponding to two or three times the upper limit of the range of wavelength and including the optical path difference of 0.

Control unit 43 determines the three-dimensional shape information and the spectral information of object 10 from white light fringes represented by a plurality of image signals received from image sensor 3.

Hereinafter, the principle for measuring the three-dimensional shape and the spectral information of object 10 by spectrally-resolved three-dimensional shape measurement device 1 is described.

Function R (x,y) representing the phase modulation on a light wave caused by a spherical mirror having focal length f is expressed by the following equation:

$$R(x, y) = \exp\left[-\frac{ik}{2f}(x^2 + y^2)\right] \quad (1)$$

$$= Q_{xy}\left(-\frac{1}{f}\right)$$

where k denotes a wave number, (x,y) denotes a position of the reflection surface of the spherical mirror in the x-axis direction and the y-axis direction. If the spherical mirror has a positive power (i.e., the spherical mirror is a concave mirror), focal length f is a positive value.

For example, the distance between a point on the optical axis of first reflecting mirror 22 and the origin is denoted by $d_0$, and the distance between a point on the optical axis of first reflecting mirror 22 and image sensor 3 is denoted by $d_1$. It is assumed that second reflecting mirror 23 moves by distance Z/2 away from beam splitting element 21 in the x direction, from the position at which the optical path difference between luminous flux B1 and luminous flux B2 is 0 to the position at which the optical path length difference is Z. In this case, luminous flux B1 emitted from point $r_s=(x_s,y_s,z_s)$ on object 10 propagates by distance $(d_0-z_s)$ to be modulated by first reflecting mirror 22, and further propagates by distance $d_1$ to be sensed at image sensor 3. Luminous flux B2 emitted from point $r_s$ propagates by distance $(d_0-z_s+Z/2)$ to be modulated by second reflecting mirror 23, and further propagates by distance $(d_1+Z/2)$ to be sensed at image sensor 3. Accordingly, the light wave corresponding to luminous flux B1 and the light wave corresponding to luminous flux B2 on image sensor 3 are expressed by the following equations, with no consideration for a quadratic phase factor for the position of point $r_s$ that is not related to regeneration of a three-dimensional image:

$$U_1(\rho, \omega) = A\frac{f_1}{d_1 f_1 + (d_0 - z_s)f_1 - (d_0 - z_s)} \quad (2)$$

$$\exp[ik(d_0 + d_1 - z_s)] \times \exp\left[\frac{ik}{2}\frac{f_1 - (d_0 - z_s)}{d_1 f_1 + (d_0 - z_s)f_1 - (d_0 - z_s)d_1}\right.$$

$$\left.\left\{\left(X - \frac{f_1}{f_1 - (d_0 - z_s)}x_s\right)^2 + \left(Y - \frac{f_1}{f_1 - (d_0 - z_s)}y_s\right)^2\right\}\right]$$

$$U_2(\rho_{is}, \omega) = A\frac{f_2}{d_1 f_2 + (d_0 - z_s)f_2 - (d_0 - z_s)} \quad (3)$$

$$\exp[ik(d_0 + d_1 - z_s)] \times \exp\left[\frac{ik}{2}\frac{f_2 - (d_0 - z_s)}{d_1 f_2 + (d_0 - z_s)f_2 - (d_0 - z_s)d_1}\right.$$

$$\left.\left\{\left(X - \frac{f_2}{f_2 - (d_0 - z_s)}x_s\right)^2 + \left(Y - \frac{f_2}{f_2 - (d_0 - z_s)}y_s\right)^2\right\}\right]$$

where $\rho_{is}=(X,Y)$ denotes coordinates in a real space on image sensor 3; $\rho=(X,Y,Z)=(\rho_{is},Z)$ denotes a position vector representing the position after a movement by distance Z in the x direction from the sensing surface (Z=0) of image sensor 3; $f_1$ and $f_2$ respectively denote the focal length of first reflecting mirror 22 and the focal length of second reflecting mirror 23; $\omega$ denotes a frequency according to wavelength $\lambda$ of the light wave. That is, $\omega=ck=c/\lambda$ holds, where c denotes the velocity of light and k denotes a wave number.

Interference fringes (volume interferogram) $I_p$ ($\rho,\omega$) recorded by the light emitted from a monochromatic light source at position $r_s$ and propagating via interferometer 2 are expressed by the following equation.

$$I_p(\rho, \omega) = \langle |U_1(\rho, \omega) + U_2(\rho_{is}, \omega)|^2\rangle \quad (4)$$

$$= \langle |U_1(\rho, \omega)|^2\rangle + \langle |U_2(\rho_{is}, \omega)|^2\rangle +$$
$$\langle U_1^*(\rho, \omega)U_2(\rho_{is}, \omega)\rangle + \langle U_1(\rho, \omega)U_2^*(\rho_{is}, \omega)\rangle$$

Accordingly, cross spectral density $W_s$ ($\rho,r_s,\omega$) of the optical field of interference fringes recorded by the light emitted from the monochromatic light source at position $r_s$ and propagating via interferometer 2 is defined, based on the equations (2) to (4), as the following equations:

$$W_s(\rho, r_s, \omega) = \langle U_1^*(\rho, \omega)U_2(\rho_{is}, \omega)\rangle \quad (5)$$

$$= \exp(ikZ)\exp\left\{\frac{ik}{2\gamma(z_s)}[(X - mx_s)^2 + (Y - my_s)^2]\right\}$$

where $$\gamma(z_s) = \frac{\{f_1 f_2 - (f_1 + f_2)d_1 + d_1^2\}(d_0 - z_s)^2 + \{2f_1 f_2 d_1 - (f_1 + f_2)d_1^2\}(d_0 - z_s) + f_1 f_2 d_1^2}{(d_0 - z_s)^2(f_2 - f_1)}$$

$$m = -\frac{d_1}{d_0 - z_s}$$

where $\gamma(z_s)$ denotes a curvature radius of a spherical wave phase recorded as interference fringes, and m denotes a lateral magnification of a three-dimensional image of the light source. Solving curvature radius $\gamma(z_s)$ for $z_s$ provides the following equation.

$$z_s = d_0\frac{2f_1 f_2 d_1 - d_1^2(f_1 + f_2) + \sqrt{d_1^4(f_1 + f_2)^2 + 4f_1 f_2 d_1^2\{\gamma(z_s)(f_2 - f_1) - d_1^2\}}}{2\{\gamma(z_s)(f_2 - f_1) - f_1 f_2 + (f_1 + f_2)d_1 - d_1^2\}} \quad (6)$$

Thus, from the value of curvature radius γ ($z_s$), an object value converted into a reference coordinate system, namely, a coordinate system for point $r_s$ on object 10, is determined.

In general, light from each point on object 10 is incoherent with each other. That is, light from each point interferes only with itself but does not interfere with light from the other points. A hologram, which is a record of white light fringes obtained on image sensor 3, additionally includes the intensity of white light fringes of light from each point on object 10. Accordingly, when the distribution of light from each point on object 10 is denoted by S ($r_s$,ω), white light fringes I (ρ) recorded by image signals generated by image sensor 3 are expressed as the integral of the product of S ($r_s$,ω) and interference fringes $I_p$ (ρ,ω) generated by the monochromatic point light source expressed by equation (4), with respect to point $r_s$, by the following equation:

$$I(\rho) = \int d^3 r_s d\omega S(r_s, \omega) I_p(\rho, r_s, \omega) \quad (7)$$
$$= \Gamma_1(\rho) + \Gamma_2(\rho) + \Gamma_{12}(\rho) + \Gamma_{12}^*(\rho)$$

where $\Gamma_1$ (ρ) and $\Gamma_2$ (ρ) denote light intensities of luminous flux B1 and luminous flux B2, respectively, as independent light waves. Spatial coherence function $\Gamma_{12}$ (ρ) is expressed by the following equation:

$$\Gamma_{12}(\rho) = \int_0^\infty d\omega \exp(ikZ) \int d^3 r_s S(r_s, \omega) \exp \quad (8)$$
$$\left\{ \frac{ik}{2\gamma(z_s)}[(X - mx_s)^2 + (Y - my_s)^2] \right\}$$
$$= c \int dk \exp(ikZ) W(\rho_{is}, r_s, \omega)$$

$$W(\rho_{is}, r_s, \omega) = \int d^3 r_s S(r_s, \omega) \exp\left\{ \frac{ik}{2\gamma(z_s)}[(X - mx_s)^2 + (Y - my_s)^2] \right\}$$

where W ($\rho_{is}$,$r_s$,ω) denotes a complex hologram representing the spectral information of each point on object 10. Performing Fourier transformation on spatial coherence function $\Gamma_{12}$ (ρ) with respect to optical path difference Z provides a set of cross spectral density W ($\rho_{is}$,$r_s$,ω) for each wavelength.

Since $\rho_{is}$=(X,Y,0) holds, performing back-propagation computation based on Fresnel diffraction integral on W ($\rho_{is}$,$r_s$,ω) provides regenerated image O (x',y',z',ω) of object 10 at regeneration distance z' for each wavelength as expressed by the following equation.

$$O(x', y'z', \omega) = \quad (9)$$
$$\int dXdY W(X, Y, r_s, \omega) \exp\left(-\frac{ik}{2z'}[(X - x')^2 + (Y - y')^2]\right)$$

If regeneration distance z' is equal to curvature radius γ ($z_s$) included in cross spectral density W ($\rho_{is}$,$r_s$,ω), a focused image of object 10 is obtained at coordinates (x',y'), which are obtained by enlarging coordinates ($x_s$,$y_s$) at position $z_s$ by magnification m.

Figure 3:
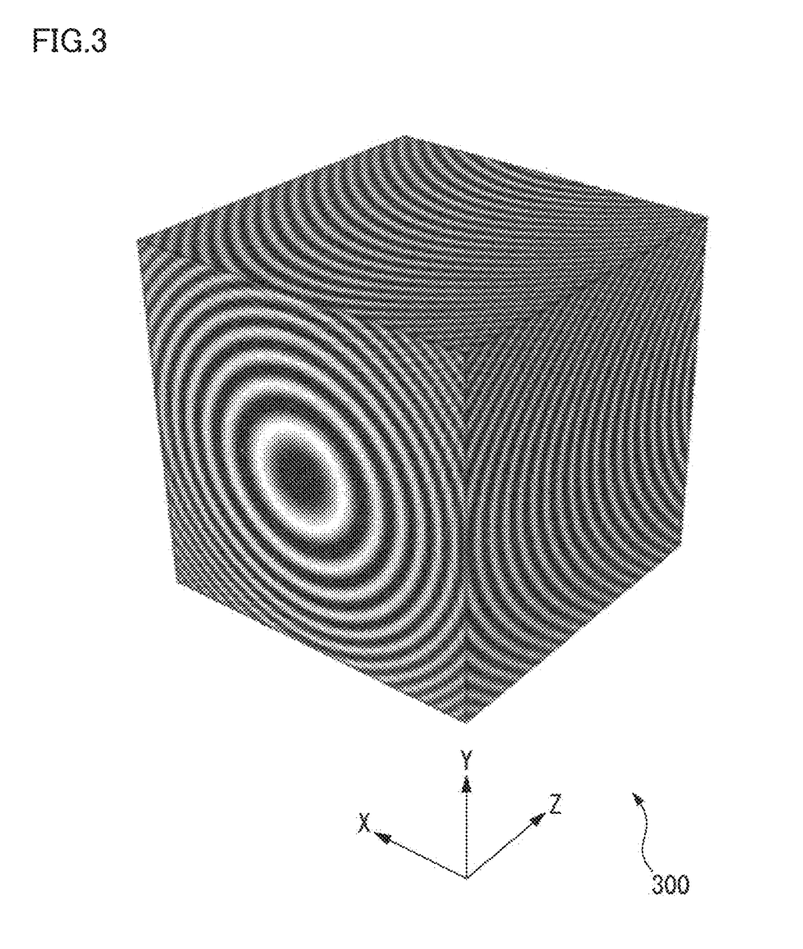
FIG. 3 is a schematic view of white light fringes obtained by a spectrally-resolved three-dimensional shape measurement device according to one embodiment of the present invention.

FIG. 3 shows a schematic view of a white light fringe signal acquired by spectrally-resolved three-dimensional shape measurement device 1. For example, if object 10 is a point light source on the optical axis of first reflecting mirror 22, white light fringes 300 are three-dimensional interference fringes in a Cartesian coordinate system as shown in FIG. 3, where the axes representing two directions X and Y are orthogonal to each other on image sensor 3 and where the axis representing optical path difference Z between luminous flux B1 and luminous flux B2 is orthogonal to each of the above two axes. Image sensor 3 generates an image signal representing white light fringes in an XY-plane for each value of optical path difference Z. Therefore, white light fringes 300 are obtained by stacking the image signal for each Z value. White light fringes 300 form concentric interference fringes in an XY-plane. In the direction of optical path difference Z between luminous fluxes B1 and B2, white light fringes 300 form concentric interference fringes that depend on the length of Z.

Figure 4:
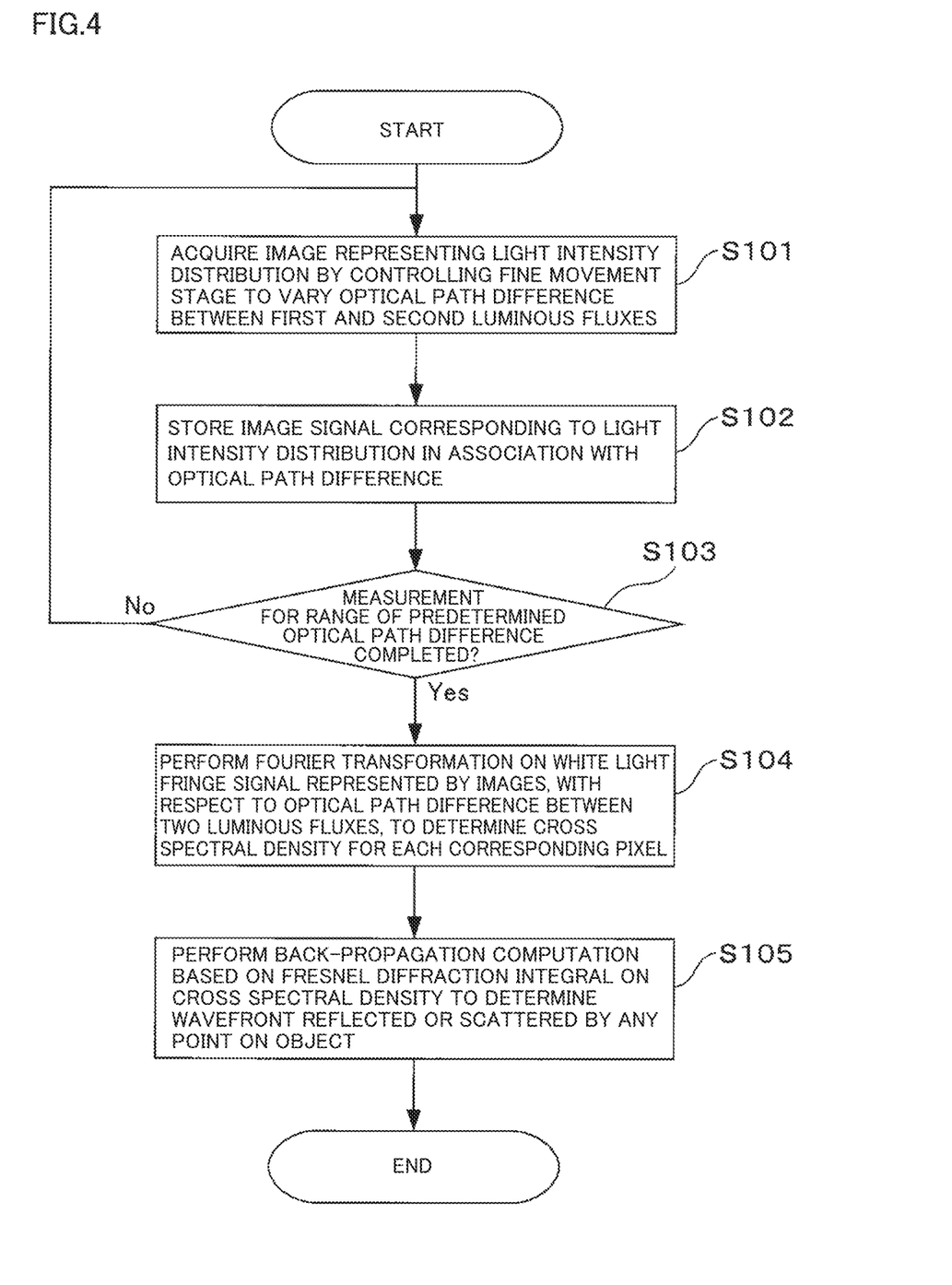
FIG. 4 is an operation flowchart of a spectrally-resolved three-dimensional shape measurement device according to one embodiment of the present invention.

FIG. 4 shows an operation flowchart of spectrally-resolved three-dimensional shape measurement device 1 in measuring the three-dimensional shape and the color of object 10. The operation described hereinafter is controlled by controller 4.

When the measurement starts, control unit 43 of controller 4 acquires an image representing the light intensity distribution generated by image sensor 3, by sending a control signal to fine movement stage 24 via communication unit 42 to vary the optical path difference between luminous flux B1 and luminous flux B2 (step S101). Control unit 43 stores, in storage unit 41 of controller 4, an image signal corresponding to the light intensity distribution received from image sensor 3, with the image signal being associated with the optical path difference between luminous flux B1 and luminous flux B2 (step S102). Control unit 43 determines whether or not the image signal has been obtained over the entire range of a predetermined optical path difference (step S103). When the image signal has not been obtained over the entire range of the optical path difference, control unit 43 returns the control to step S101, controls fine movement stage 24 to change the optical path difference, and repeats steps S101 to S103.

When the image signal has been obtained over the entire range of the predetermined optical path difference at step S103, control unit 43 performs Fourier transformation, for each corresponding pixel, on a white light fringe signal represented by a plurality of image signals stored in storage unit 41, with respect to the optical path difference between luminous fluxes B1 and B2, in accordance with the above equations (6) and (7), thus determining cross spectral density W ($\rho_{is}$,ω) (step S104). Control unit 43 performs back-propagation computation based on Fresnel diffraction integral on the determined cross spectral density W ($\rho_{is}$,ω) in accordance with equation (7), thus determining a regenerated wavefront from each point on object 10 (step S105). Controller 4 then ends the process.

As described above, a spectrally-resolved three-dimensional shape measurement device according to one embodiment of the present invention splits light reflected or scattered by an object illuminated with white light into two luminous fluxes, reflects the two luminous fluxes on reflecting mirrors having different curvatures, and combines the reflected two luminous fluxes again. The spectrally-resolved three-dimensional shape measurement device records, by using an image sensor, wavefronts of the combined luminous flux, by varying the optical path difference between the two luminous fluxes, thus obtaining white light fringes. The spectrally-resolved three-dimensional shape measurement device performs, for each pixel, Fourier transformation with respect to the optical path difference to determine a cross spectral density representing the spectral information of each point on the object. The spectrally-resolved three-dimensional shape measurement device further performs back-propagation computation based on Fresnel diffraction integral on the cross spectral density to determine a regenerated wavefront from each point on the object representing the three-dimensional information of the object. Thus, the spectrally-resolved three-dimensional shape measurement device is simply required to move one of the reflecting mirrors along one axis for obtaining white light fringes. Therefore, the time required for measuring the three-dimensional shape and the spectral information of the object is reduced.

The scope of the present invention is not limited to the above embodiment. For example, the two reflecting mirrors included in interferometer 2 may change positions with each other.

In order to change the optical path difference between luminous fluxes B1 and B2, first reflecting mirror 22 may be moved to change the distance between first reflecting mirror 22 and beam splitting element 21, instead of moving second reflecting mirror 23.

At least one of the two reflecting mirrors may be formed by a reflective spatial light modulator, such as an LCOS. In this case, controller 4 can change the curvature of the reflecting mirror by adjusting the voltage to be applied to a liquid crystal layer concentrically around the optical axis of the reflecting mirror. By adjusting the voltage to be applied to the liquid crystal layer of the spatial light modulator that forms the reflecting mirror, controller 4 can control the curvature of the reflecting mirror to provide a good signal-to-noise ratio of white light fringes.

A spectrally-resolved three-dimensional shape measurement device according to the above embodiment or its variation may be used for various devices that require the spectral information and the three-dimensional shape information of an object. For example, a spectrally-resolved three-dimensional shape measurement device according to the above embodiment or its variation may be used in combination with a microscope. In this case, light from an object may be guided into an interferometer via an observation optical system of the microscope including an objective lens, for example.

As described above, a person skilled in the art can make various modifications in accordance with an embodiment within the scope of the present invention.

It should be construed that the embodiments of the present invention disclosed herein are by way of example in every respect, not by way of limitation. The scope of the present invention is defined by the terms of the claims and is intended to include any modification within the meaning and scope equivalent to the terms of the claims.

What is claimed is:

1. An apparatus for obtaining a three-dimensional shape and spectral information of an object, the apparatus comprising:
an interferometer configured to produce white light fringes based on measuring light reflected or scattered by the object illuminated with light having wavelengths;
an image sensor configured to generate an image signal for each pixel, the image signal representing an intensity distribution of light outputted from the interferometer; and
a controller connected to the image sensor and configured to determine the three-dimensional shape and the spectral information of the object from the image signal, the interferometer including:

a beam splitting element configured to split the measuring light into a first luminous flux and a second luminous flux;
a first reflecting mirror having a first reflection surface arranged for reflecting the first luminous flux to the beam splitting element, the first reflection surface having a first curvature;
a second reflecting mirror having a second reflection surface arranged for reflecting the second luminous flux to the beam splitting element, the second reflection surface having a second curvature different from the first curvature; and
a movable stage configured to move the second reflecting mirror in a first direction parallel to a straight line that connects the beam splitting element and the second reflecting mirror to each other, so as to change a distance between the beam splitting element and the second reflecting mirror, thereby producing an optical path difference between the first luminous flux and the second luminous flux,
the controller being configured to:
acquire a white light fringe signal represented by a plurality of the image signals generated by the image sensor, while controlling the movable stage to move the second reflecting mirror in the first direction;
perform frequency conversion on the white light fringe signal, with respect to the optical path difference between the first luminous flux and the second luminous flux, so as to determine a cross spectral density representing spectral information of each point on the object; and
perform back-propagation computation based on Fresnel diffraction integral on the cross spectral density, so as to determine a wavefront of light reflected or scattered at each point on the object.

2. The apparatus according to claim 1, wherein both of the first reflecting mirror and the second reflecting mirror are concave mirrors.

3. A method adapted for an apparatus,
the apparatus comprising:
an interferometer configured to produce white light fringes with measuring light reflected or scattered by an object illuminated with light having wavelengths; and
an image sensor configured to generate an image signal for each pixel, the image signal representing an intensity distribution of light outputted from the interferometer,
the interferometer including:
a beam splitting element configured to split the measuring light into a first luminous flux and a second luminous flux;
a first reflecting mirror having a reflection surface arranged for reflecting the first luminous flux to the beam splitting element, the reflection surface having a first curvature;
a second reflecting mirror having a reflection surface arranged for reflecting the second luminous flux to the beam splitting element, the reflection surface having a second curvature different from the first curvature; and
a movable stage configured to move the second reflecting mirror in a first direction parallel to a straight line that connects the beam splitting element and the second reflecting mirror to each other, so as to change a distance between the beam splitting element and the second reflecting mirror, thereby producing an optical path difference between the first luminous flux and the second luminous flux, the method comprising:
  acquiring a white light fringe signal represented by a plurality of the image signals generated by the image sensor, while controlling the movable stage to move the second reflecting mirror in the first direction;
  performing frequency conversion on the white light fringe signal, with respect to the optical path difference between the first luminous flux and the second luminous flux, so as to determine a cross spectral density representing spectral information of each point on the object; and
  performing back-propagation computation based on Fresnel diffraction integral on the cross spectral density, so as to determine a wavefront of light reflected or scattered at each point on the object.

* * * * *